United States Patent

[11] 3,621,178

[72] Inventors Kunihiro Nakayama;
 Keiichi Kojima; Shingo Kobayashi, all of Funabashi, Japan
[21] Appl. No. 3,024
[22] Filed Jan. 15, 1970
[45] Patented Nov. 16, 1971
[73] Assignee Nikon Kentetsu Kabushiki Kaisha
 Tokyo, Japan
[32] Priority Jan. 22, 1969
[33] Japan
[31] 44/4590

[54] METHOD AND APPARATUS FOR MANUFACTURING FINNED PIPES
 4 Claims, 4 Drawing Figs.
[52] U.S. Cl. .................................................. 219/107,
 219/62
[51] Int. Cl. .................................................. B23k 1/16
[50] Field of Search .................................................. 219/101,
 103, 104, 107, 117, 59, 62, 64, 67

[56] References Cited
UNITED STATES PATENTS

| | | | |
|---|---|---|---|
| 3,047,712 | 7/1962 | Morris | 219/107 |
| 3,053,971 | 9/1962 | Busse | 219/107 |
| 3,140,378 | 7/1964 | Benningoff | 219/107 X |
| 3,427,427 | 2/1969 | Rudd | 219/107 |
| 3,435,183 | 3/1969 | Vagi | 219/107 |

Primary Examiner—J. V. Truhe
Assistant Examiner—L. A. Schutzman
Attorney—Wenderoth, Lind & Ponack ABSTRACT: A metallic strip is wrapped into a helix around a metallic pipe by having one of its edges contacted by the pipe and welded on to the pipe with a welding current having a frequency ranging from 1 to 10 MHz. The current is applied across the strip and pipe from very close to a point where the strip begins to contact the pipe.

PATENTED NOV 16 1971    3,621,178

INVENTORS
KUNIHIRO NAKAYAMA
KEIICHI KOJIMA
SHINGO KOBAYASHI

BY Wenderoth, Lind & Ponack
ATTORNEYS

METHOD AND APPARATUS FOR MANUFACTURING FINNED PIPES

BACKGROUND OF THE INVENTION

This invention relates to an apparatus for manufacturing finned pipes and more particularly thin-walled finny pipes for use in heat exchangers.

In the past, it has been commonly practiced to manufacture finned pipes by rolling techniques or high frequency welding techniques. The rolling techniques have comprised pressing a length of pipe having a relatively thick wall from both the exterior and interior of the pipe by rotary rolls while the length of pipe is being rotated about the longitudinal axis thereof, thereby to decrease the wall thickness of the pipe. At the same time the length of pipe is squeezed out to cause fin portions to project externally of the pipe. In the use of such rolling techniques it has been difficult to squeeze the thin, long fin portions out from the pipe.

On the other hand, the high frequency welding techniques have comprised wrapping a thin metallic strip into a helix around the outer periphery of a length of metallic pipe while the plane of the strip extends substantially radially of the longitudinal axis of the pipe and then welding that edge contacting the outer pipe periphery of the strip to the pipe with a high frequency current flowing through the strip and pipe. Such welding techniques have been disadvantageous in that, as the pipe and the strip decrease in thickness it has been difficult to concentrate the required welding current on those portions of the pipe and strip to be welded, particularly when the pipe and strip are formed of a thermally and electrically good conductive material such as copper or aluminum, leading to the resulting weld part being locally deformed.

SUMMARY OF THE INVENTION

Accordingly it is an object of the invention to provide an improved method of manufacturing finned pipes for use in heat exchangers much smaller in thickness than those previously produced by rolling techniques or high frequency welding techniques and in reliable manner with a high efficiency.

It is another object of the invention to provide an improved apparatus for carrying out the method as above described.

The invention accomplishes these objects by the provision of a method of manufacturing finned pipe through the use of an apparatus including means for wrapping a thin metallic strip in the form of a helix around the outer periphery of a length of metallic pipe while the plane of the strip extends substantially radially of the longitudinal axis of the pipe, and welding that edge contacted by the outer periphery of the pipe of the strip to the periphery of the pipe with a short wave welding current, which method comprises the steps of passing the successive portions of the strip to predetermined positions relative to the outer periphery of the pipe, to wrap them in the form of a helix around the pipe, and supplying a short wave welding current across the pipe and the strip through those portions thereof very close to a point where the strip begins to be contacted on one edge by the pipe, the welding current having a short wave corresponding to a frequency ranging from 1 to 10 MHz.

BRIEF DESCRIPTION OF THE DRAWING

This invention will become more readily apparent from the following detailed description taken in conjunction with the accompanying drawing in which.

DESCRIPTION OF THE PREFERRED EMBODIMENT

Figure 1:
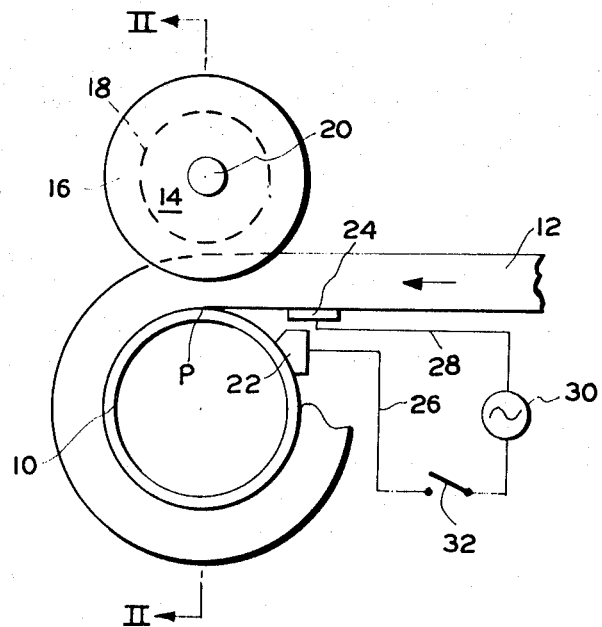
FIG. 1 is a fragmental side elevational view of an apparatus constructed in accordance with the principles of the invention with parts illustrated in section.

Referring now to the drawing and FIG. 1 in particular, there is illustrated an apparatus for manufacturing finned pipes in accordance with the principles of the invention. The arrangement illustrated comprises a length of thin-walled pipe 10 shown at the cross section and made of any suitable metal such as copper, aluminum or the like. The length of thin-walled metallic pipe 10 is adapted to be longitudinally moved in a direction normal to the plane of FIG. 1 and simultaneously in one direction, in this case, in the counterclockwise direction as viewed in FIG. 1 about the longitudinal axis thereof by any suitable drive mechanism (not shown). In order to provide fins on the outer periphery of the length of pipe 10, a strip 12 made preferably of the same metal as the pipe 10 is successively fed under a suitable tension from a supply roll (not shown) around the longitudinally moving and rotating pipe 10 as shown at the arrow in FIG. 1 to be tightly wrapped on the periphery thereof in the well known manner. In that case, the strip 12 is wrapped in the form of a helix around the pipe 10 such that it is contacted on one edge by the outer periphery of the length of pipe 10, and the plane thereof extends substantially radially of the longitudinal axis of the pipe 10.

Figure 2:
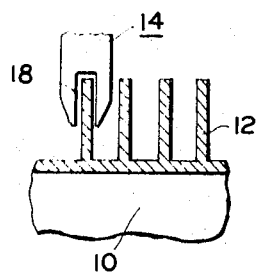
FIG. 2 is a sectional view taken along the line II—II of FIG. 1.

In order to prevent the successive portions of the strip 12 from being laterally displaced from their predetermined positions relative to the pipe 10, a guide element generally designated by the reference numeral 14 is disposed on the passageway of the strip 12 above the pipe 10. The guide element 14 is preferably formed of a rotatable disc 16 having disposed on the outer periphery a circumferential groove 18 serving to carry the adjacent portion of the strip 12 therein (see FIG. 2). The disc 16 is rotatable about a shaft 20 loosely extending through the center thereof in parallel relationship with the longitudinal axis of the pipe 10.

As shown in FIG. 1, an electric contact 22 is fixedly disposed in sliding contact with the outer periphery of the moving pipe 10 on that portion thereof very close to the point P where the strip 12 begins to contact the pipe 10 and another electric contact 24 is also fixedly disposed in sliding contact with the lower edge of the strip 12 at its position very close to the abovementioned point P. Then both the contacts 22 and 24 are electrically connected by leads 26 and 28 across a short wave generator 30 through a normally open switch 32.

After the strip 12 has been suitably fixed at the free end to the outer periphery of the length of pipe 10 with the plane of the strip 12 extending substantially radially of the longitudinal axis of the pipe 10 the latter can be moved as above described while the switch 32 is put in its closed position. Then the strip 12 responds to the movement of the pipe 10 to be pulled out from its supply roll (not shown) and placed in position relative to the outer periphery of the pipe 10 by the guide element 14 whereby it is wrapped in the form of a helix around the outer periphery of the pipe 10. Due to the closure of the switch 32, the short wave generator 30 supplies a short wave welding current across the pipe 10 and the strip 12 through the contacts 22 and 24 for welding.

Figure 3A:
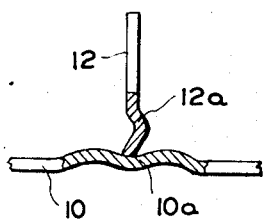
FIG. 3A and B are fragmental sectional views of weld parts formed by the prior art practice and the present invention respectively.

The prior art practice utilizing high frequency welding has comprised the use of welding currents having the frequency as low as from 10 to 450 KHz and a pair of electric contacts such as the contacts 22 and 24 remote from that position where the strip begins to be contacted by and welded to the associated pipe. This measure has impeded the concentration of the welding current to those portions of the pipe and strip to be welded and, particularly when the pipe and strip are made of a thermally and electrically good conductive material such as copper, aluminum or any of alloys thereof. More specifically, in that event, the welding current could not effectively flow through those portions of the pipe and strip required to be welded to each other and might frequently flow through any undesirable portions thereof. This is because the welding current of such a low frequency can penetrate the associated metal to a depth as great as from 0.8 to 0.15 mm. for copper and from 1.05 to 0.2 mm. for aluminum. Therefore heat generated in the materials for the pipe and strip due to a flow of welding current therethrough is rapidly transmitted over large portions of the materials, whereby the temperature of the parts to be welded can not increase to the required magnitude. Alternatively the portion adjacent to the part to be welded of the material may excessively increase in temperature. Thus the resulting weld parts have frequently included the pipe portion and/or the fins locally deformed such as shown by the reference characters 10a and 12a in FIG. 3A.

For the reasons as above described, the prior art practice has been subject to such limitations that for pipes having an outside diameter of 127.5 mm., the wall thickness thereof should be equal to or greater than from 1.5 to 2.0 mm. and the thickness of the strip should be equal to or greater than 1 mm.

In order to eliminate those disadvantages, the invention comprises the use of a welding current having a short wave ranging from 1 to 10 MHz. The use of frequencies less than 1 MHz leads to the disadvantages as previously described in conjunction with the prior art practice. On the other hand, the use of a welding current having a frequency exceeding 10 MHz results in the leakage of that portion of the current flowing through the surfaces of the metallic pipe and strip. This leakage of the welding current causes a loss of the thermal energy and therefore a decrease in effectiveness of the resistance welding. Further, there is not provided a heating temperature required for welding and the short wave generator involved is expensive. Also, such frequencies are subject to radio interferences.

For the above reasons the present invention uses a short wave of a high frequency ranging form 1 to 10 MHz, whereby the so-called skin effect is enhanced.

This skin effect permits the welding current to penetrate the associated metal only to a depth as small as from 0.08 to 0.025 mm. for copper and from 0.15 to 0.045 mm. for aluminum. In other words, the depth of penetration decreases by a factor of about 10 as compared with the prior art practice. Therefore the welding current is permitted only to flow through the metallic pipe and the associated strip on those portions very near to the surfaces alone, thereby resulting in the concentration of the thermal energy to the particular areas to be welded.

Figure 3B:
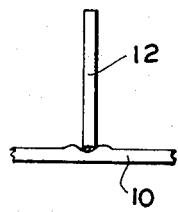

The welding current of such a short wave cooperates with the contacts 22 and 24 very close to the contact point P to cause the current to flow through the pipe and the strip through a short distance along the surfaces thereof between the contacts 22 and 24. Therefore only those portions of the pipe and strip to be welded are locally heated whereby as soon as the strip has been wrapped around the pipe, the strip is welded to the pipe at the point P where they have first contacted each other, resulting in the completed finned pipe. It has been found that the resulting weld includes a fused portion reaching a depth equal to or less than 0.15 mm. measured from the associated surface. FIG. 3B illustrates a weld part accurate in shape which has been formed by the present invention. As an example, fins having a thickness of 0.3 mm. were easily and accurately welded to the outer periphery of copper pipe having a wall thickness of 0.8 mm. which was considered to be quite impossible by the prior art practice.

What we claim is:

1. A method of manufacturing finned pipe through the use of an apparatus including means for wrapping an thin metallic strip in the form of a helix around the outer periphery of a length of metallic pipe while the plane of the strip extends substantially radially of the longitudinal axis of the pipe, and welding that edge contacted by the outer periphery of the pipe of the strip to the periphery of the pipe with a short wave welding current, which method comprises the steps of passing the successive portions of said strip to their predetermined positions relative to said outer periphery of said pipe to wrap said portions in the form of a helix around said pipe, slidingly positioning a first electrical contact on the edge of said strip to be welded to said pipe at a position closely adjacent that point where said strip first contacts said pipe, slidingly positioning a second electrical contact on said pipe closely adjacent said point, and supplying a short wave welding current through said contacts across said pipe and said strip to said point, said welding current having a frequency ranging from 1 to 10 MHz.

2. A method of manufacturing a finned pipe as claimed in claim 1 wherein said metallic strip is formed of a metallic material selected from the group consisting of copper and alloys thereof and has a thickness of from 0.15 to 0.8 mm. and a width of from 5 to 25 mm.

3. A method of manufacturing a finned pipe as claimed in claim 1 wherein said metallic strip is formed of a metallic material selected from the group consisting of aluminum and alloys thereof and has a thickness of from 0.2 to 1.05 mm. and a width of from 7 to 30 mm.

4. In an apparatus for manufacturing finned pipes, including means for wrapping a thin metallic strip in the form of a helix around the outer periphery of a length of metallic pipe while the plane of said strip extends substantially radially of the longitudinal axis of said pipe and for welding that edge of said strip contacted by the outer periphery of said pipe to the periphery of said pipe with a short wave welding current, the combination comprising guide means for passing successive portions of said strip to their predetermined positions relative to said outer periphery of said pipe to wrap them in the form of a helix around said pipe, a first electrical contact slidingly positioned on said edge of said strip to be welded to said pipe at a position closely adjacent that point where said strip first contacts said pipe, a second electrical contact slidingly positioned on said pipe closely adjacent said point, and short wave generator means connected across said first and second electric contacts for providing a welding current having a frequency ranging from 1 to 10 MHz.